(12) United States Patent
Panigrahi et al.

(10) Patent No.: US 10,070,360 B2
(45) Date of Patent: Sep. 4, 2018

(54) METHOD AND SYSTEM FOR DEVICE-TO-DEVICE OFFLOADING IN LTE NETWORKS

(71) Applicant: Tata Consultancy Services Limited, Mumbai (IN)

(72) Inventors: Bighnaraj Panigrahi, Bangalore (IN); Rashmi Ramamohan, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/212,948

(22) Filed: Jul. 18, 2016

(65) Prior Publication Data

US 2017/0026885 A1  Jan. 26, 2017

(30) Foreign Application Priority Data

Jul. 21, 2015 (IN) .......................... 2754/MUM/2015

(51) Int. Cl.
*H04W 36/22* (2009.01)
*H04W 76/23* (2018.01)
*H04W 92/18* (2009.01)
*H04W 72/12* (2009.01)

(52) U.S. Cl.
CPC ....... *H04W 36/22* (2013.01); *H04W 72/1252* (2013.01); *H04W 76/23* (2018.02); *H04W 92/18* (2013.01)

(58) Field of Classification Search
CPC ............. H04W 36/22; H04W 72/1252; H04W 76/043; H04W 92/18
See application file for complete search history.

(56) References Cited

U.S. PATENT DOCUMENTS

| 2013/0073671 | A1* | 3/2013 | Nagpal | H04W 76/14 709/217 |
| 2013/0336230 | A1* | 12/2013 | Zou | H04W 72/085 370/329 |
| 2014/0293843 | A1* | 10/2014 | Papasakellariou | H04W 72/042 370/280 |

OTHER PUBLICATIONS

Asadi, A. et al., A Survey on Device-to-Device Communication in Cellular Networks, IEEE Communications Surveys & Tutorials, IEEE, vol. 16, Issue 4, pp. 1-18, Apr. 2014.

* cited by examiner

*Primary Examiner* — Frantz Bataille
(74) *Attorney, Agent, or Firm* — Finnegan, Henderson, Farabow, Garrett & Dunner LLP (57) ABSTRACT

A method and system is provided for device-to-device (D2D) offloading in long term evolution (LTE) networks. The present application provides a method and system for device-to-device (D2D) offloading in long term evolution (LTE) networks, comprising processor implemented steps of selecting an offloader by a eNodeB (eNB) for a user device out of a plurality of user devices based on location of the user device and other closed proximity user devices, corresponding load and channel conditions upon receiving the offloading request from the user device; exchanging a control messages between the user device and the eNB; and between the eNB and the offloader; and scheduling of resource blocks (RBs) by the eNB for the user device and the offloader in D2D offloading.

18 Claims, 9 Drawing Sheets

METHOD AND SYSTEM FOR DEVICE-TO-DEVICE OFFLOADING IN LTE NETWORKS

PRIORITY CLAIM

This U.S. patent application claims priority under 35 U.S.C. § 119 to: India Application No. 2754/MUM/2015, filed on Jul. 21, 2015. The entire contents of the aforementioned application are incorporated herein by reference.

TECHNICAL FIELD

The present application generally relates to long term evolution (LTE) networks. Particularly, the application provides a method and system for device-to-device (D2D) offloading in LTE networks.

BACKGROUND

In today's cellular networks (2G/3G/4G), there is a tremendous demand for high data rate services such as video sharing, gaming, proximity-aware-social-networking, etc. However, the vulnerability of the cellular network to radio channel affects the performance of data services significantly. For an example, users at a cell edge, users with bad radio channel, users inside a lift or basement, etc., may not get a fair quality of service (QoS) experience compared to other users. While, in this process, the resource blocks (RBs) assigned to these users also gets underutilized or wasted. With the increase in mobile traffic and bandwidth demand, Device-to-Device (D2D) communication underlying Long Term Evolution (LTE) networks has gained tremendous interest by the researchers, cellular operators and equipment manufacturers.

A majority of existing solutions relies on the application of D2D communication only to emergency services. However, prior art literature has never explored the D2D communication in commercial applications. Prior art literature is also silent on commercial D2D offloading scheme for users who may be at cell edges, inside some isolated environments like basement or large buildings, or have a seriously bad channel. Prior art literature has never disclosed about discovering the available idle D2D neighbors for such bad channel users, and close proximity users can directly communicate among themselves bypassing eNodeB (eNB) and using the same cellular resources such as licensed spectrum, RBs associated with the same eNB and offload its data to the D2D neighbor. Some of the prior art literature vaguely describe about D2D communication, however, they are not be able to identify an offloading partner for data transmission among a plurality of available offloading partners.

Prior art literature have illustrated various method for device-to-device communication, however, device-to-device offloading in LTE networks is still considered as one of the biggest challenges of the technical domain.

OBJECTIVES

In accordance with the present invention, the primary objective is to provide a method and system for device-to-device (D2D) offloading in long term evolution (LTE) networks.

Another objective of the invention is to provide a method and system for selecting an offloader by a eNodeB (eNB) for a user device out of a plurality of user devices based on location of the user device and other closed proximity user devices out of the plurality of user devices, corresponding load and channel conditions upon receiving the offloading request from the user device.

Another objective of the invention is to provide a method and system for exchanging a control messages between the user device and the eNB; and between the eNB and the offloader.

Another objective of the invention is to provide a method and system for scheduling of resource blocks (RBs) by the eNB for the user device and the offloader using fixed modulation scheme for D2D offloading.

Another objective of the invention is to provide a method and system for scheduling of resource blocks (RBs) by the eNB for the user device and the offloader using adaptive modulation scheme for D2D offloading.

Other objects and advantages of the present invention will be more apparent from the following description when read in conjunction with the accompanying figures, which are not intended to limit the scope of the present disclosure.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for device-to-device (D2D) offloading in long term evolution (LTE) networks.

The present application provides a computer implemented method for device-to-device (D2D) offloading in long term evolution (LTE) networks, wherein said method comprising processor implemented steps of selecting an offloader (104 D) by a eNodeB (eNB) (102) for a user device (104 C) out of a plurality of user devices (104 A, 104 B, 104 C and 104 D) based on location of the user device (104 C) and other closed proximity user devices (104 A, 104 B, and 104 D) out of the plurality of user devices (104 A, 104 B, 104 C and 104 D), corresponding load and channel conditions upon receiving the offloading request from the user device (104 C); exchanging a control messages between the user device (104 C) and the eNB (102); and between the eNB (102) and the offloader (104 D); and scheduling of resource blocks (RBs) by the eNB (102) for the user device (104 C) and the offloader (104 D) in D2D offloading.

The present application provides a system (200) for device-to-device (D2D) offloading in long term evolution (LTE) networks; said system (200) comprising an eNodeB (eNB) (102) communicatively coupled with a plurality of user devices (104 A, 104 B, 104 C and 104 D) adapted for selecting an offloader (104 D) by for a user device (104 C) out of the plurality of user devices (104 A, 104 B, 104 C and 104 D) based on location of the user device (104 C) and other closed proximity user devices (104 A, 104 B, and 104 D) out of the plurality of user devices (104 A, 104 B, 104 C and 104 D), corresponding load and channel conditions upon receiving the offloading request from the user device (104 C); exchanging control messages with the user device (104 C); and with the offloader (104 D); and scheduling of resource blocks (RBs) for the user device (104 C) and the offloader (104 D) in D2D offloading.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present application provides a computer implemented method and system for device-to-device offloading in LTE networks.

Figure 1:
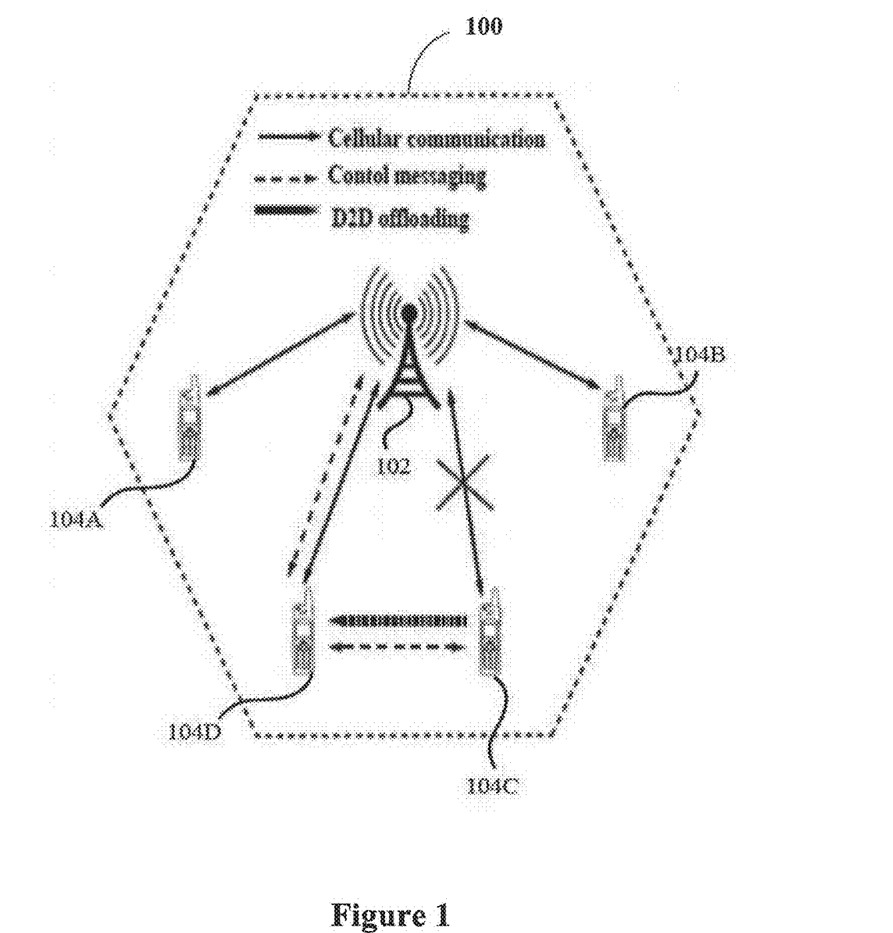
FIG. 1: illustrates a system for device-to-device offloading in long term evolution (LTE) networks, according to an embodiment of a present subject matter.

Referring to FIG. 1 is a system (100) for device-to-device (D2D) offloading in long term evolution (LTE) networks, according to an embodiment of a present subject matter. As shown in FIG. 1, the system (100) includes a single cell including an eNodeB (eNB) (102) and a plurality of user devices (104 A, 104 B, 104 C and 104 D). Further, the user devices (104 A, 104 B, 104 C and 104 D) are communicatively coupled to the eNB (102). In an example, the user devices (104 A, 104 B, 104 C and 104 D) are assumed to be static or with limited mobility so that there are minimum fluctuations in channel conditions of user devices.

In an embodiment, two types of communication modes may be possible between the eNB (102) and the user devices (104 A, 104 B, 104 C and 104 D), such as (i) a cellular communication mode wherein a user device transmits data to the eNB (102) directly and (ii) a D2D offloading communication mode wherein a user device relays data to the eNB (102) via another close-by user device. Based on the wireless channel condition between the user devices (104 A, 104 B, 104 C and 104 D) and the eNB (102), the user devices (104 A, 104 B, 104 C and 104 D) are divided into two sets, such as (i) user devices having a good channel to the eNB (102) and (ii) user devices having a bad channel to the eNB (102). In this embodiment, the user devices having the good channel to the eNB (102) communicate directly with the eNB (102) using the cellular communication mode and the user devices having the bad channel to the eNB (102) use the D2D offloading communication mode. In FIG. 1, the user device (104 C) has a bad channel to the eNB (102).

For example, channels between the user devices (104 A, 104 B, 104 C and 104 D) and eNB (102) are considered to be time varying in nature. The channel is assumed to be remain constant for at least one LTE frame duration. The variations in a received signal strength due to environment obstructions is defined as shadowing and is considered to be a random log-normal (Gaussian variable, $N(0, \sigma^2)$ with mean 0 and variance $\sigma^2$ in logarithmic domain). Multi-path Rayleigh fading is also considered and modeled by considering exponential distribution with mean $\beta$.

In an exemplary embodiment, the user device (104 C) requests to transmit data to the eNB (102) through control channels. Further, the eNB (102) collects information such as availability, channel conditions, etc., and decides a mode of communication based on signal to noise ratio (SNR). The transmission power of the user devices (104 A, 104 B, 104 C and 104 D) can be controlled by the eNB (102), such that the received SNR is above a specified threshold (SINRth).

In another embodiment SNR calculation is described. Let $Pt_{max}$ be a maximum transmit power in dBm, $d_{ij}$ be a distance between the user device (104 C) (also referred as $UE_i$) and node j (node j can be the eNB (102) or any other user device). Then, the received power $Pr_{ij}$ can be expressed in logarithmic form as:

$$Pr_{ij} = Pt_{max} - P_{ij}^{LOSS}$$

$$P_{ij}^{LOSS} = \gamma \log_{10}(d_{ij} + f) + L_{sh} + L_{rl} + L_a$$

Where, f is a frequency of operation, and $\gamma$ as a path loss exponent, Lsh and Lrl be losses due to the Log normal shadowing and Rayleigh fading, respectively and La is a location specific loss where the user device (104 C) is placed. Location specific loss is important and should be factored in the path loss computation as the user device (104 C) with the bad channel can be placed inside a lift or in the basement or some other place. Using signaling techniques, the eNB (102) can compute the path loss parameters and the total loss value $P_{ij}^{LOSS}$. Let No be the additive white Gaussian noise power. For example, received SNRij can be determined as:

$$SNR_{ij} = \frac{Pr_{ij}}{No}$$

If the channel conditions between the user device (104 C) and the eNB (102) are good, i.e., the SNR of the channel is above the threshold limit, then the regular cellular communication mode is used (i.e., scheduling of resource blocks (RBs) and data transfer between the user device (104 C) and the eNB (102). If the channel conditions between the user device (104 C) and the eNB (102) are bad, i.e., the SINR of the channel is below the threshold limit for cellular communication, then the D2D communication mode can be considered network assisted. In an example, the D2D communication mode is considered for data transmission between the user device (104 C) and the eNB (102) as the user device (104 C) has the bad channel to the eNB (102) as shown in FIG. 1. The terms "RB" and "Frame" are referring to the same meaning, however both the terms have been used interchangeably throughout the specification.

Furthermore, based on a location of the user device (104 C) and other user devices (104 A, 104 B, and 104 D), their load and channel conditions, the eNB (102) selects a potential offloader for the user device (104 C). In an exemplary embodiment, the user device (104 D) is a D2D offloader for the user device (104 C) and the user device (104 D) and offloader terminologies are interchangeably used throughout the complete specification. Upon selecting the D2D offloader, control messages, such as synchronization information are exchanged between the user device (104 D) and eNB (102). Similarly, control messages are exchanged between the user device (104 C) and user device (104 D). In addition, a scheduling phase where RBs are scheduled or assigned in a frame to frame basis is performed by the eNB (102) for the user devices (104 C) and (104 D). For example, in the first phase, the RBs are scheduled for D2D transmission i.e., between the user device (104 C) and the user device (104 D). In the second phase, the RBs are scheduled for the transmission from the user device (104 D) to the eNB (102). Also, after the completion of scheduling phase, the data is transferred from the user device (104 C) to the user device (104 D) and from the user device (104 D) to the eNB (102).

In some embodiments, when the SNR between the user device (104 C) and the eNB (102) is below SNRth, the user device (104 C) selects the offloader through a request or reply method (new signaling techniques) and conveys a message to the eNB (102), regarding the offloader (ad-hoc mode). Upon selecting the offloader, the data is sent to the eNB (102) via the offloader as discussed above.

Figure 2:
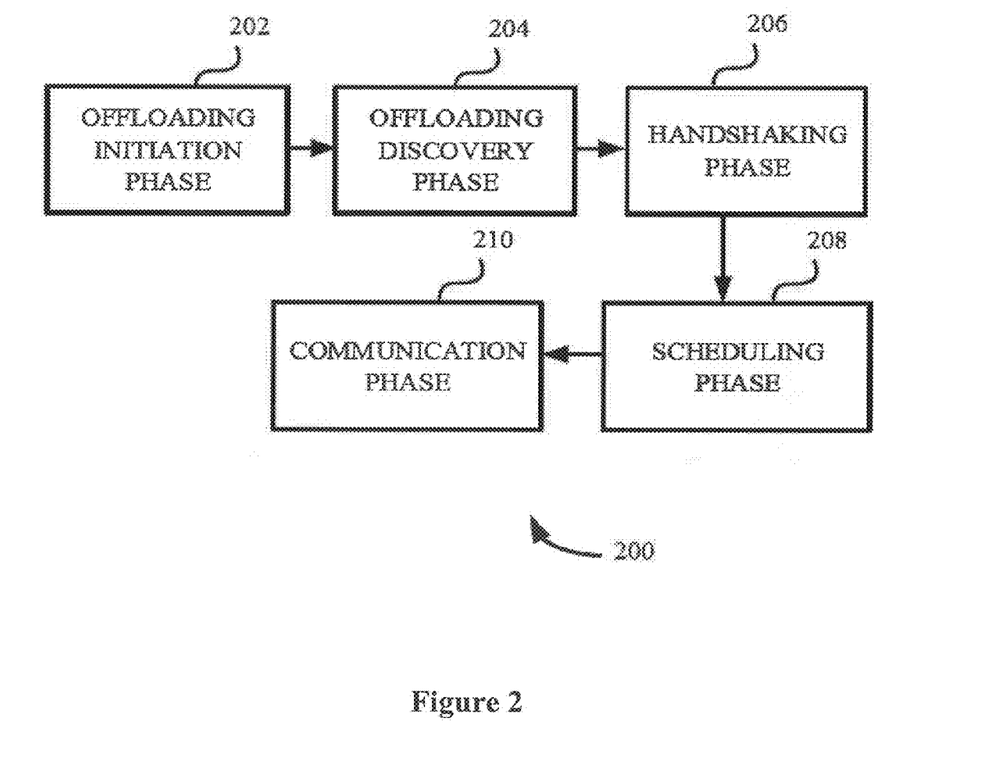
FIG. 2: illustrates a flow diagram illustrating a method for device-to-device offloading in LTE networks, according to an embodiment of a present subject matter.

Referring to FIG. 2 is a flow diagram (200) illustrating a method for performing D2D offloading in LTE networks, according to an embodiment of a present subject matter. As shown in the FIG. 2, the flow diagram (200) includes an offloading initiation phase (202), an offloading discovery phase (204), a handshaking phase (206), a scheduling phase (208), and a communication phase (210).

In the offloading initiation phase (202), offloading initiation can be made by the eNB (102) or by the user device (104 C) (the ad-hoc mode). In an eNB (102) initiated type, the user device (104 C) with the bad channel can send the control messages, which is usually transmitted at a higher power to the eNB (102), then the eNB (102) offers a D2D offloading communication mode depending on the user device's (104 C) location and availability of any close-by D2D offloader (e.g., the user device (104 D)). In a user device (104 C) initiated type (the ad-hoc mode), the user device (104 C) is in completely isolated environment, the user device (104 C) can relay the offloading initiation request through a known close-by user device who has a good channel to the eNB (102).

At offloading discovery phase 204, a close-by user device is selected to become a potential offloader. For example, let 'm' be a number of offloaders available for the user device (104 C) (i.e., $UE_i$). This is determined by scanning for offloaders within a small D2D radius of '$r_d$'. Now, the $UE_i$ has one direct (cellular, directly to the eNB (102)) and 'm' offloading paths to choose from. Let $x_{ij}$, $\forall j \in (1, \ldots, m, e)$ be a Boolean variable which indicates whether the communication between nodes (i.e., user device or eNB: e) i and j is active or not. For example, $x_{ie}=0$ indicates that there is no direct path from the node i (i.e., the user device (104 C)) to the eNB (102) and $x_{ij}=0$ indicates that the node j cannot be an offloader for the UE because of unavailability, mobility, etc., of the offloader node. Let $p_{ij}$ be a probability of an unsuccessful transmission of an RB between the nodes i and j. Therefore, expected number of hybrid automatic repeat request (HARQ) retransmissions required per RB between the nodes i and j can be given as:

$$r_{ij} = \frac{1}{P_{ij}} \quad (1)$$

Let $k_{ij}$ be a number of RBs required to transmit the desired data from the node i to the node j (computed by the eNB (102) as assumed earlier) and $C_{ij}$ is a cost associated for each RB transmission. Then, a total cost associated with the transmission between the nodes i and j is:

$$C_{ij} = k_{ij} \times r_{ij} \times c_{ij} \quad (2)$$

In addition to the above, the $UE_j$ needs to relay the data received from the $UE_i$ to the eNB (102). The cost associated with this relay can also be calculated in a similar way as in equation (2). Let cost associated with this relay be $C_{je}$ and $C_{ie}$ be the cost associated with the direct transmission between $UE_i$ and the eNB (102). Using the above costs for transmission, the eNB (102) needs to solve the following optimization problem such that the communication mode (whether direct or via offloader) and the optimal offloader can be selected. Note that, in case of AMC, $C_{ij}$ is different depending on the channel condition and hence required number of RBs.

Maximize $(C_{ie} \times x_{ie} + \Sigma_{j=1}^{m}(C_{ij}+C_{je})Xx_{ij})$, (i) $SNR_{ij} \geq SNR_{th}: \forall j \in (1, \ldots, m)$, (ii) $SNR_{ie}, SNR_{je} \geq SNR_{th}: \forall j \in (1, \ldots, m)$, (iii) $x_{ie}, x_{ij} = 0/1: \forall j$, (iv) $x_{ie} + \Sigma_{j=1}^{m} x_{ij} \leq 1: \forall j$. \quad (3)

Constraints (i), (ii) in equation (3) are to ensure the SNR profile of the available communication paths to be at least SNRth. Constraint (iii) defines the Boolean variables for the possibility of a path, and constraint (iv) makes sure that out of the total (m+1) available paths, the eNB (102) selects only one.

Referring to FIG. 1, the user device (104 D) can be the potential D2D offloader for the user device (104 C). The selection can be either network assisted or ad-hoc type. In network assisted type, the channel condition between the user device (104 C) and the eNB (102) is such that only offloading request can be communicated as a part of the control channel message between the user device (104 C) and the eNB (102). The eNB (102) who is capable of extracting information of the user device (104 C) and its neighbor user device's locations, their load and channel condition, etc., can select the offloader (i.e., the user device (104 D) as the offloader for the user device (104 C)). In the ad-hoc discovery type, the user device (104 C) itself finds a suitable offloader among its nearest user devices with a request or reply method and then conveys the message to the eNB (102). In this case, the part of the optimization problem (equation (3)) is solved by the user device (104 C) itself. Although, network assisted selection is more power consuming, it is more reliable and backward compatible. In case, there is no D2D offloader available, then D2D offloading cannot be processed and the user device (104 C) has to fall back to regular cellular communication mode.

Figure 4:
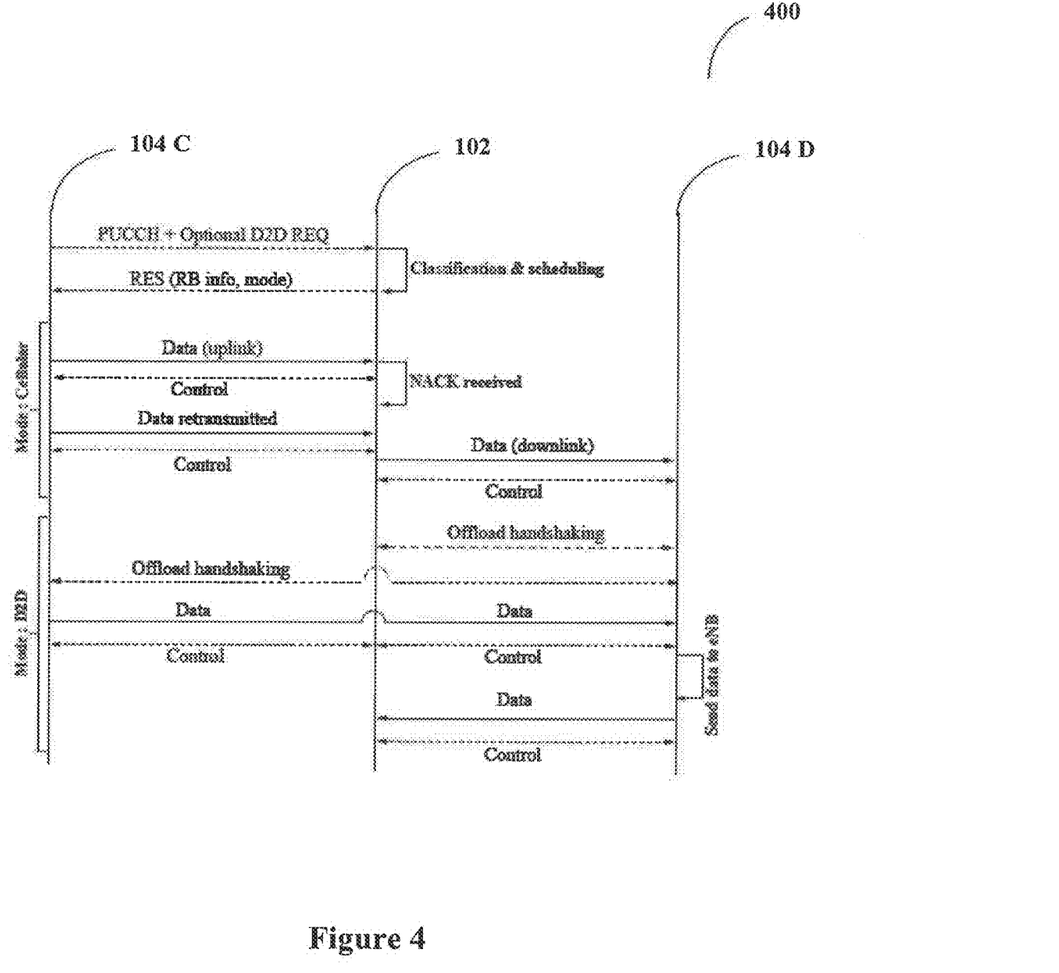
FIG. 4: illustrates a control flow diagram illustrating a data communication phase during device-to-device offloading, according to an embodiment of a present subject matter.

At the handshaking phase 206, control messages are exchanged between the user device (104 C) and the eNB (102) and between the eNB (102) and user device (104 D). The control flow diagram of a handshaking mechanism is shown in FIG. 4.

In another embodiment of the present invention power control for D2D communication is described. Since, the distance between the D2D communication user devices (104 A, 104 B, 104 C and 104 D) is very less, a reduced transmit power is desired. This is computed and informed to the user device (104 C) by the eNB (102) in the handshaking phase. If $Pr_{ij}$ is the maximum received power between the D2D nodes i and j corresponding to $Pt_{max}$, then the reduced transmission power for D2D communication is expressed as:

$$Ptc_{ij} \geq SNR_{th} \times N_o + P_{ij}^{LOSS}$$

At the scheduling phase 208, for data transmission, the user device (104 C) sends scheduling request (SR) signaling in a Physical Uplink Control Channel (PUCCH) to the eNB (102). After receiving the request, the eNB (102) assigns RBs for the data transfer between the requesting user device (104 C) to the user device (104 D) and between the user device (104 D) and the eNB (102). The scheduling information is broadcasted to the user devices (104 C) and (104 D) using a Physical Downlink Control Channel (PDCCH). In an example, the eNB (102) schedules the RBs for both cellular as well as D2D offload transmissions. Both cellular and D2D communication use non-overlapped RBs for their data communication. Since, the D2D offloading is a two-step process that takes place serially, a two phase scheduling scheme for D2D offload scheduling is proposed. In the first phase, D2D transmission, i.e, from the user device (104C) to user device (104 D) is scheduled and in the second phase the transmission of the user device (104 D) (offloader) to the eNB (102) is scheduled. These two phases can take place in same LTE time frame or different and should ensure (i) there should not be anytime overlapping of a first phase RB with any second phase RB and (ii) the first phase should occur prior to the second phase.

At the communication phase 210, which is the actual data communication phase, the user device (104 C) first transmits data to the user device (104 D) in the allotted RB set. The user device (104 D) then relays the data to the eNB (102) in a later scheduled frame.

The order in which the method(s) are described is not intended to be construed as a limitation, and any number of the described method blocks can be combined in any order to implement the method 200, or an alternative method. Additionally, individual blocks may be deleted from the methods without departing from the spirit and scope of the subject matter described herein. Furthermore, the method 200 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

Figure 3:
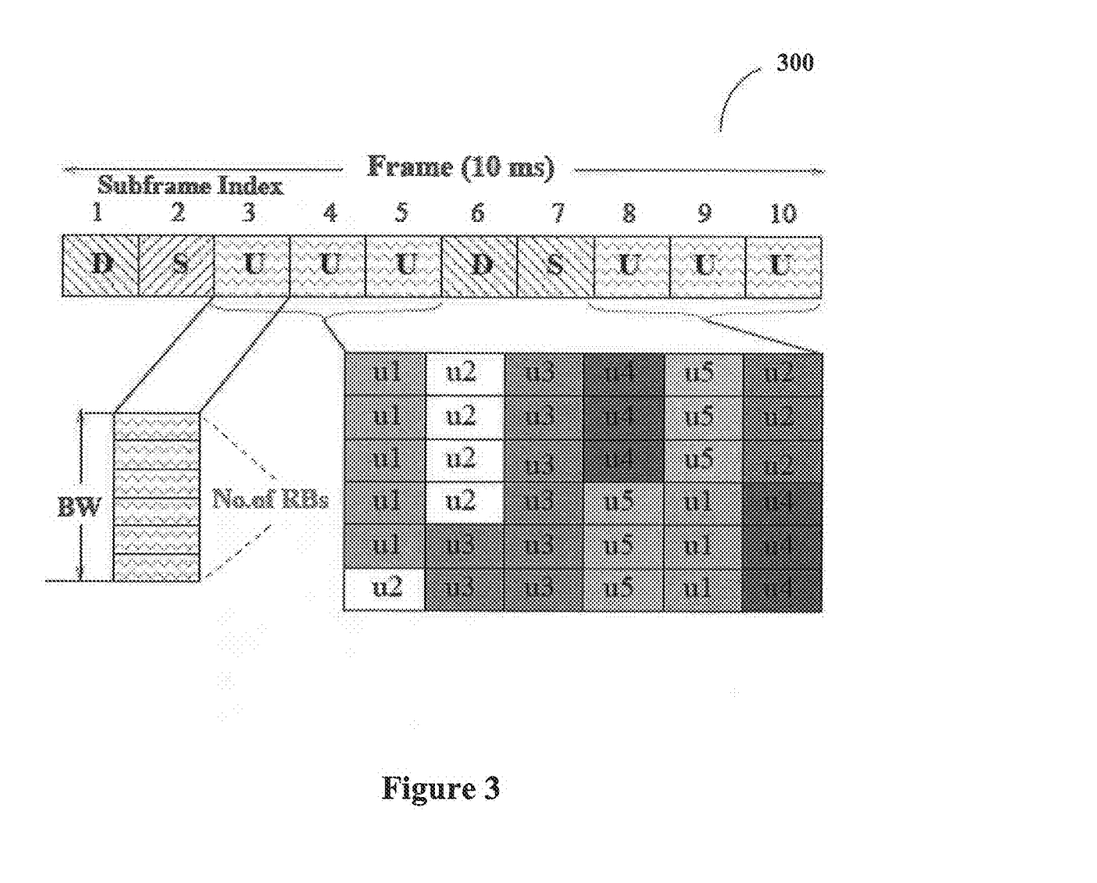
FIG. 3: illustrates a LTE uplink time division duplexing (TDD) frame structure, according to an embodiment of a present subject matter.

Referring to FIG. 3 illustrates a LTE uplink time division duplexing (TDD) frame structure (300) according to an embodiment of a present subject matter. Consider standard LTE TDD frame structure (300) with a periodicity of 5 milli seconds (ms). The frame length is 10 ms and the frames consists of 10 sub-frames each of 1 ms length. The sub-frames can either be uplink (U), downlink (D) or special (S) sub-frames. As shown in the FIG. 3, six sub-frames are used for uplink scheduling. For example, the system bandwidth is 1.4 megahertz (MHz) and it consists of six RBs. The bandwidth of each RB is 180 kHz and consists of 12 sub carriers of 15 kHz each. For example, for D2D communications only the uplink frames are used for scheduling as (i) higher transmission power of the eNB 102 can create interference for D2D reception and (ii) modeling of a single channel frequency division multiple access (SC-FDMA) receiver is more feasible and power efficient than having an orthogonal frequency division multiple access (OFDMA) transmitter which will have higher peak to average power ratio (PAPR).

For example, the user devices (104 A, 104 B, 104 C and 104 D) have different amount of uplink data to transmit to the eNB (102). With fixed modulation scheme and fixed data rate in place, the eNB (102) can compute the number of RBs required by one user device beforehand and can schedule the number of RBs in a frame by frame basis. In case of adaptive modulation scheme, the required RBs for users may vary depending on their channel conditions. The performance of the network depends upon the selection of the mode of communication, i.e., using direct cellular or D2D offloading and the selection of the offloader in the possible case when multiple user devices can act as an offloader for a particular user device.

In another embodiment of the present invention, scheduling of resource blocks (RBs) by the eNB (102) for the user device (104 C) and the offloader (104 D) in D2D offloading. The resource blocks (RBs) are scheduled by the eNB (102) for the user device (104 C) and the offloader (104 D) with fixed modulation scheme where the eNB (102) assign fixed modulation scheme for uplink communication between the plurality of user devices (104 A, 104 B, 104 C and 104 D) and the eNB (102), irrespective of the channel condition of the plurality of user devices (104 A, 104 B, 104 C and 104 D).

The resource blocks (RBs) are scheduled by the eNB (102) for the user device (104 C) and the offloader (104 D) with fixed modulation scheme where the eNB (102) assign variable modulation schemes, Binary Phase Shift Keying (BPSK), Quadrature Phase Shift Keying (BPSK), or Quadrature Amplitude Modulation (QAM) for the uplink communication between the plurality of user devices (104 A, 104 B, 104 C and 104 D) and the eNB (102), depending on the channel condition of the plurality of user devices (104 A, 104 B, 104 C and 104 D).

In another embodiment of the present invention, in cellular networks, instead of SINR, Channel Quality Indicator (CQI) is used to estimate the channel characteristics of a user device. CQI is a function of the received SINR with index ranging between 0 to 15. Based on the CQI profile, modulation and coding schemes are decided. Higher the SINR value, higher is the CQI index; hence better is the modulation scheme. For example, if the SINR is around 4 dB (corresponding CQI index is 2), the appropriate modulation scheme to be used is Quadrature Phase Shift Keying (QPSK) with two-bits per symbol. Similarly with SINR more than 12 dB (corresponding CQI index of 15), the appropriate modulation scheme to be used is 64-Quadrature Amplitude Modulation (QAM) with six-bits per symbol.

The channel characteristics of the plurality of user devices (104 A, 104 B, 104 C and 104 D) are dynamic in nature and depend on various factors such as distance from the eNB (102), path loss factors, surrounding infrastructure, etc. A user device out of the plurality of user devices (104 A, 104 B, 104 C and 104 D) with a good channel profile can directly use the cellular mode of transmission to uplink their data to the eNB (102), such as transmission between the user device (104 A) and eNB (102) according to the FIG. 1. The user devices out of the plurality of user devices (104 A, 104 B, 104 C and 104 D) experiencing a poor channel profile to the eNB (102) may use the D2D offloading mode of communication to relay their data. Unlike the direct one-hop transmission, D2D offloading mechanism has a two-hop transmission process: (i) first hop D2D transmission from the poor channel user device to a close proximity D2D relay user device, such as the user device (104 C) to the user device (104 D) according to the FIG. 1 and (ii) second hop relay transmission from the D2D relay user device to the eNB (102), such as the user device (104 D) to the eNB (102) according to the FIG. 1. Note that, the D2D transmission is a close proximity transmission, whereas relay transmission is similar to cellular uplink transmission. The non-overlapping inband D2D communication is assumed in the current implementation. The D2D offloading mechanism assumes the channel conditions of both the D2D as well as the relay transmission to be fairly good. With the dynamic nature of channel, to maximize the system throughput the eNB (102) selects optimal mode of communication for any UE (cellular or D2D offloading), classifies and schedules them.

Figure 5:
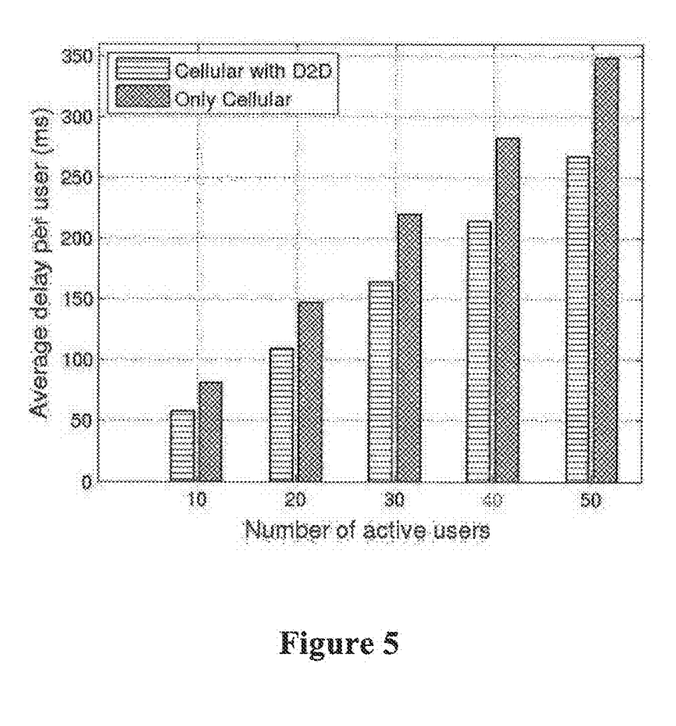
FIG. 5: illustrates a graphical representation of average delay per user vs. number of active users in fixed modulation.

Referring to FIG. 5 is a graphical representation of average delay per user vs. number of active users in fixed modulation.

In another embodiment of the present invention, it is observed that average per user delay is less when D2D offloading is used in comparison to regular cellular communication, due to the multiple retransmissions that occurred in the cellular communication as the channel conditions between the plurality of user devices (104 A, 104 B, 104 C and 104 D) and eNB (102) is bad. Therefore, the usage of D2D offloading improves the QoS of the users.

Figure 6:
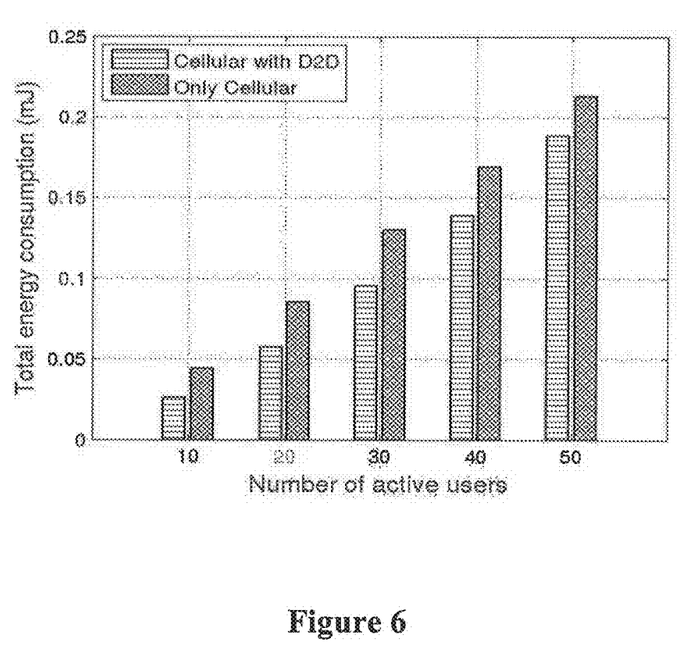
FIG. 6: illustrates a graphical representation of total energy consumption vs. number of active users fixed modulation.

Referring to FIG. 6 is a graphical representation of total energy consumption vs. number of active users fixed modulation.

In another embodiment of the present invention, it is observed that the total energy consumption is higher in case of regular cellular communication mode as compared to the D2D communication mode. This is due to the lower transmit power usage of the plurality of user devices (104 A, 104 B, 104 C and 104 D) and higher success rate of the D2D offloading as compared to the regular ones. Energy consumption is computed by considering the maximum transmission power of user device and the transmission time interval (TTI) of an RB. Energy performance also includes the overhead energy consumption in the D2D offloader discovery, handshaking, and control signal transmissions.

Figure 7:
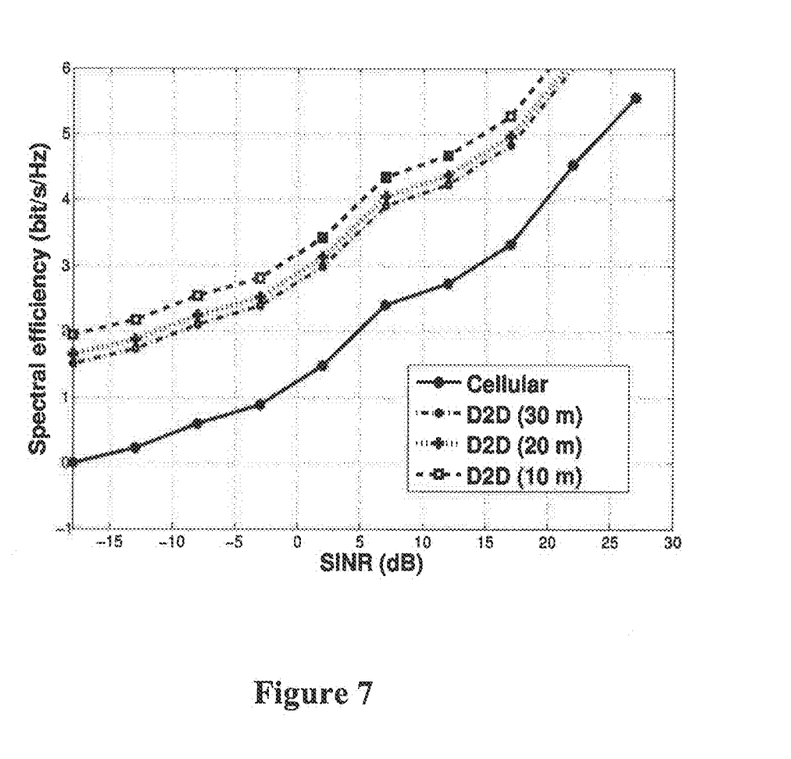
FIG. 7: illustrates a graphical representation of improvement in spectral efficiency due to D2D offloading in adaptive modulation.

Referring to FIG. 7 is a graphical representation of improvement in spectral efficiency due to D2D offloading in adaptive modulation.

In another embodiment of the present invention, the performance of D2D offloading vs. existing cellular network was evaluated in terms of spectral efficiency improvement. The simulated scenario consisted on three different D2D ranges to accommodate users with low to high transmission power capability. It is observed that for user devices with low SINR profiles, D2D offloading can provide better spectral efficiency. Moreover, closer the D2D relay node, better is the spectral efficiency.

Figure 8:
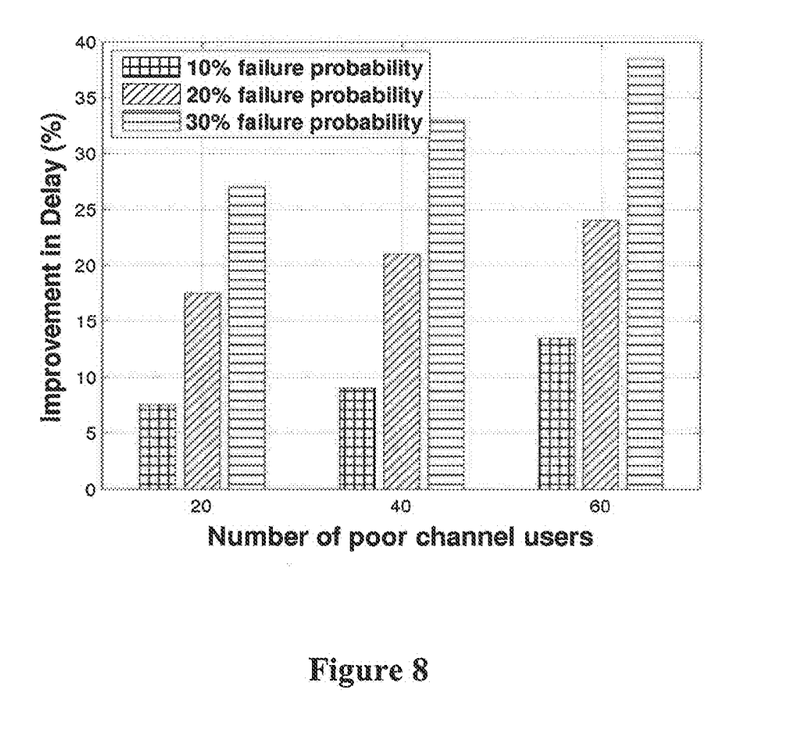
FIG. 8: illustrates a graphical representation of bandwidth utilization with increasing number of D2D users adaptive modulation.

Referring to FIG. 8 is a graphical representation of bandwidth utilization with increasing number of D2D users adaptive modulation.

In another embodiment of the present invention, the variation in the system performance in terms of average per user bandwidth utilization with increase in the number of poor channel users as well as variable transmission failure probability was evaluated. It is observed that as the channel condition becomes worse, BER drops resulting in more retransmissions and hence more resource (RB) utilization. Thus, in such situations, D2D offloading gives improved system performance.

Figure 9:
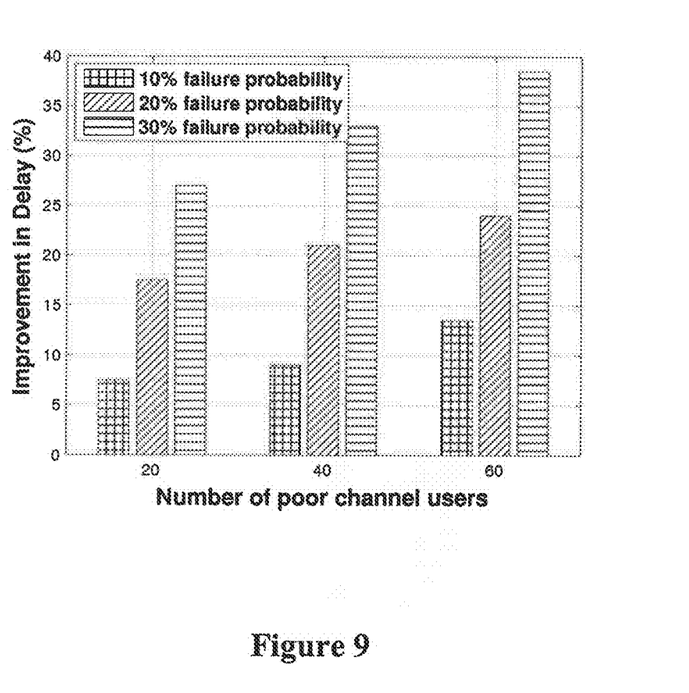
FIG. 9: illustrates a graphical representation of improvement in average per user delay of D2D offloading over cellular communication in adaptive modulation.

Referring to FIG. 9 is a graphical representation of improvement in average per user delay of D2D offloading over cellular communication in adaptive modulation.

In another embodiment of the present invention, it is observed that the average per user delay is better in D2D offloading case as compared to others and delay worsens with more number of poor channel users.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

Referring to FIG. 1 through FIG. 9, various embodiments propose a technique for a unique selection and signaling mechanism to select D2D partners for a user device with bad communication channel. This technique provides a novel uplink scheduling scheme for LTE networks with D2D offloading communications which is highly configurable and adaptable to the underlying LTE network and enhances the network performance in terms of (i) spectral efficiency of the network, (ii) overall energy consumption and hence life time of the network, (iii) connectivity to users, etc.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for device-to-device (D2D) offloading in long term evolution (LTE) networks; said method comprising processor implemented steps of:
   a. selecting an offloader by a eNodeB (eNB) for a user device out of a plurality of user devices based on location of the user device and other closed proximity user devices out of the plurality of user devices, corresponding load and channel conditions upon receiving the offloading request from the user device;
   b. exchanging a control messages between the user device and the eNB; and between the eNB and the offloader; and
   c. scheduling of resource blocks (RBs) by the eNB for the user device and the offloader in D2D offloading, wherein scheduling of the resource blocks (RBs) includes the eNB assigning a fixed modulation scheme for uplink communication between the plurality of user devices and the eNB.

2. The method as claimed in claim 1, further comprising selecting the offloader by the eNodeB for the user device out of the plurality of user devices by scanning for the potential offloader within a small D2D radius; selecting a Boolean variable indicating communication between the user device out of the plurality of user devices and the eNodeB, thereby determining the direct cellular communication mode between the user device out of the plurality of user devices and the eNodeB or D2D offloading communication mode between the user device out of the plurality of user devices and the eNodeB, wherein a user device relays data to the eNB via another close-by user device.

3. The method claimed in claim 1, wherein the user device having a bad channel to the eNB is below a system determined threshold limit SNR for data transmission between the user device and the eNB.

4. The method as claimed in claim 1, further comprising selecting the offloader by the user device through a request or reply method, when SNR between the user device and the eNB is below the threshold limit SNR; and conveying a message to the eNB regarding the offloader.

5. The method as claimed in claim 1, further comprising the initiating offloader selection by the user device, wherein the user device relays the offloading initiation request through a known close-by user device having a good channel to the eNB.

6. The method as claimed in claim 1, wherein the control message comprises synchronization information.

7. The method as claimed in claim 1, wherein the scheduling of resource blocks (RBs) by the eNB for the user device and the offloader further comprises scheduling of RBs for the transmission from the offloader to the eNB.

8. The method as claimed in claim 1, further comprising transmitting information from the user device to the offloader in the allotted RBs and relaying the information by the offloader to the eNB in a later scheduled RBs.

9. The method as claimed in claim 1, further comprising sending scheduling request (SR) signaling for scheduling of resource blocks (RBs) by the user device in a Physical Uplink Control Channel (PUCCH) to the eNB.

10. The method as claimed in claim 1, further comprising broadcasting scheduling information of resource blocks (RBs) to the user device and the offloader using a Physical Downlink Control Channel (PDCCH).

11. The method as claimed in claim 1, further comprising scheduling the resource blocks (RBs) by the eNB for the user device and the offloader with fixed modulation scheme where the eNB assigns the fixed modulation scheme for uplink communication between the plurality of user devices and the eNB, irrespective of the channel condition of the plurality of user devices.

12. The method as claimed in claim 1, further comprising scheduling the resource blocks (RBs) by the eNB for the user device and the offloader with fixed modulation scheme where the eNB assigns variable modulation schemes, Binary Phase Shift Keying (BPSK), Quadrature Phase Shift Keying (BPSK), or Quadrature Amplitude Modulation (QAM) for the uplink communication between the plurality of user devices and the eNB, depending on the channel condition of the plurality of user devices.

13. A system for device-to-device (D2D) offloading in long term evolution (LTE) networks; said system comprising an eNodeB (eNB) communicatively coupled with a plurality of user devices adapted for selecting an offloader by for a user device out of the plurality of user devices based on location of the user device and other closed proximity user devices out of the plurality of user devices, corresponding load and channel conditions upon receiving the offloading request from the user device; exchanging a control messages with the user device; and with the offloader; and
   scheduling of resource blocks (RBs) for the user device and the offloader in D2D offloading, wherein scheduling of the resource blocks (RBs) includes the eNB assigning a fixed modulation scheme for uplink communication between the plurality of user and the eNB.

14. The system as claimed in claim 13, wherein the user device having a bad channel to the eNB is below a system determined threshold limit SNR for data transmission between the user device and the eNB.

15. The system as claimed in claim 13, wherein the scheduling of resource blocks (RBs) by the eNB for the user device and the offloader further comprises scheduling of RBs for the transmission from the offloader to the eNB.

16. The system as claimed in claim 13, wherein the resource blocks (RBs) are scheduled by the eNB for the user device and the offloader with fixed modulation scheme where the eNB assigns the fixed modulation scheme for uplink communication between the plurality of user devices and the eNB, irrespective of the channel condition of the plurality of user devices.

17. The system as claimed in claim 13, wherein the resource blocks (RBs) are scheduled by the eNB for the user device and the offloader with fixed modulation scheme where the eNB assigns variable modulation schemes, Binary Phase Shift Keying (BPSK), Quadrature Phase Shift Keying (BPSK), or Quadrature Amplitude Modulation (QAM) for the uplink communication between the plurality of user devices and the eNB, depending on the channel condition of the plurality of user devices.

18. The system as claimed in claim 13, further transmitting information from the user device to the offloader in the allotted RBs and relaying the information by the offloader to the eNB in a later scheduled RBs.

\* \* \* \* \*